United States Patent
Huang et al.

(10) Patent No.: US 7,792,028 B2
(45) Date of Patent: Sep. 7, 2010

(54) TWO-TIER CALL ADMISSION CONTROL METHOD IN IEEE 802.11 WLAN

(75) Inventors: Ching Yao Huang, HsinChu (TW); Yuan Hwai Shih, Taipei (TW)

(73) Assignee: National Chiao Tung University, Hsinchu (TW)

( * ) Notice: Subject to any disclaimer, the term of this patent is extended or adjusted under 35 U.S.C. 154(b) by 778 days.

(21) Appl. No.: 11/606,419

(22) Filed: Nov. 30, 2006

(65) Prior Publication Data
US 2008/0075050 A1  Mar. 27, 2008

(30) Foreign Application Priority Data
Sep. 22, 2006  (TW) .............................. 95135077 A

(51) Int. Cl.
*G01R 31/08* (2006.01)
*H04W 4/00* (2009.01)

(52) U.S. Cl. ........................ 370/230; 370/252; 370/338

(58) Field of Classification Search ................ 370/230, 370/252, 338, 401, 412, 465
See application file for complete search history.

(56) References Cited

U.S. PATENT DOCUMENTS

| | | | |
|---|---|---|---|
| 6,216,006 B1 | 4/2001 | Scholefield et al. | |
| 6,377,549 B1 | 4/2002 | Ngo et al. | |
| 2002/0141376 A1* | 10/2002 | Kandala | 370/348 |
| 2005/0100022 A1* | 5/2005 | Ramprashad | 370/395.42 |
| 2005/0270975 A1* | 12/2005 | Meylan et al. | 370/229 |
| 2006/0045051 A1* | 3/2006 | Floros et al. | 370/332 |
| 2007/0147241 A1* | 6/2007 | Wang et al. | 370/230 |
| 2007/0165610 A1* | 7/2007 | Tseng et al. | 370/356 |

OTHER PUBLICATIONS

Wing Fai Fan, Deyun Gao, Danny H.K. Tsang "Admission Control for Variable Bit Rate Traffic in IEEE 802.11e WLANs" Proc. 2004 Joint Conference of the 10$^{th}$ Asia-Pacific Conference on Communications and the 5$^{th}$ International Symposium on Multi-Dimensional Mobil Communications ( APCC/MDMC'O4) Beijing, China, Aug. 29-Sep. 1, 2004.

* cited by examiner

*Primary Examiner*—Nittaya Juntima
(74) *Attorney, Agent, or Firm*—Bucknam and Archer

(57) ABSTRACT

The present invention discloses a two-tier call admission control algorithm in IEEE 802.11 WLAN. The two-tier call admission control algorithm is given to improve the overall system throughput and guarantee the quality of service of every single user in the WLAN.

5 Claims, 3 Drawing Sheets

TWO-TIER CALL ADMISSION CONTROL METHOD IN IEEE 802.11 WLAN

FIELD OF THE INVENTION

The present invention relates to a two-tier call admission control algorithm and in particular relates to a two-tier call admission control algorithm for IEEE 802.11 WLAN.

BACKGROUND OF THE INVENTION AND PRIOR ART

For the recent years, because the population using the wireless broadband is growing in each day, the ability to constantly maintain the quality of the service of various data transmissions (for example, voice, data or multimedia) in a consistent level becomes much more important. In order to fulfill this requirement, integration of various different kinds of the wireless communication systems has gradually become the contemporary technology developing trend. Among the numerous integration techniques, IEEE 802.1 WAN (Wireless Area Network), which utilizes a modulation method known as the orthogonal frequency division multiplex (OFDM) and therefore provides a very high transmission rate (6 Mbps~54 Mbps), has been widely adopted as one of the integration systems. However, because the covering region is very limited, IEEE 802.11 WLAN is usually installed in places having more users, such as offices, campuses or aerodromes. Additionally, the major drawback existing in the IEEE 802.11 WLAN is that, if the user is in motion even with a small amount of speed, the transmission performance of the system will be substantially degraded.

In U.S. Pat. No. 6,216,006, a method for admission control for wireless data networks was disclosed, in which a value prescribed by the user has to be set in advance and the performance of the bandwidth estimator is easily influenced by this value; however, it is not possible to obtain an optimal value in order to conform with the network load and network status.

In U.S. Pat. No. 6,377,549, a method for call admission control system for wireless ATM (asynchronous transfer mode) networks was disclosed, in which said method does not consider the change of SINR (Signal-to-Interference & Noise Ratio) in the mobile end and therefore a very harmful effect is induced with respect to the mobile transmission rate.

In APCC/MDMC'04 (The Tenth Asia-Pacific Conference on Communications and the 5th International Symposium on Multi-Dimensional Mobile Communications, 2004), Wing Fai Fan, Deyun Gao, Danny H. K. Tsang, and Brahim Bensaou disclosed a method for admission control for variable bit rate communication traffic in IEEE 802.11e WLANs, in which the control strategy is overly complicated for the computation of TXOP (Transmission Opportunity) effect and therefore, even if the complicated computation could be overcome, it still has the problem that the reliability is relatively low for not considering the condition of the physical layer.

SUMMARY OF THE INVENTION

The objective of the present invention is to provide a two-tier call admission control algorithm for IEEE 802.11 WLAN, which can be used to improve the transmission throughput of the overall system, while guarantees the quality of service for every single user.

In accordance with the above-mentioned objective, the physical layer and media access control layer of IEEE 802.11 WLANs are analyzed, and the maximum transmission throughput that can be achieved by every different mode of IEEE 802.11 WLANs in different frequency channels is investigated, in the meantime Markov chains are used to derive the mathematical model for the automatic adjustment algorithm of the connection rate. The present invention proposes a method for a two-tier call admission control algorithm for IEEE 802.11 WLAN, in which the two-tier call admission control algorithm is used to admit of the provision of the service request where high quality of service is a key factor. The algorithm consists of the following step: to have a single user and the overall system corresponding respectively to a first layer testing and a second layer testing.

Because the present invention adopts a two-tier method to process the user and the system algorithm, it is therefore able to improve the transmission throughput, and the quality of service of every single user can be guaranteed.

In order to make the above-mentioned and other objectives, characteristics, and advantages of the present invention become more apparent, preferred embodiments of the present invention are subsequently described in detail by referring to the accompanying drawings.

BRIEF DESCRIPTION OF THE DRAWINGS

Preferred embodiments of the present invention are subsequently described by referring to the accompanied drawings, where the same number indicates the same component.

S101~S117 Steps

DETAILED DESCRIPTION OF THE PREFERRED EMBODIMENTS

Preferred embodiments of the present invention are subsequently described by referring to the accompanying drawings, where the same number indicates the same component.

Figure 1:
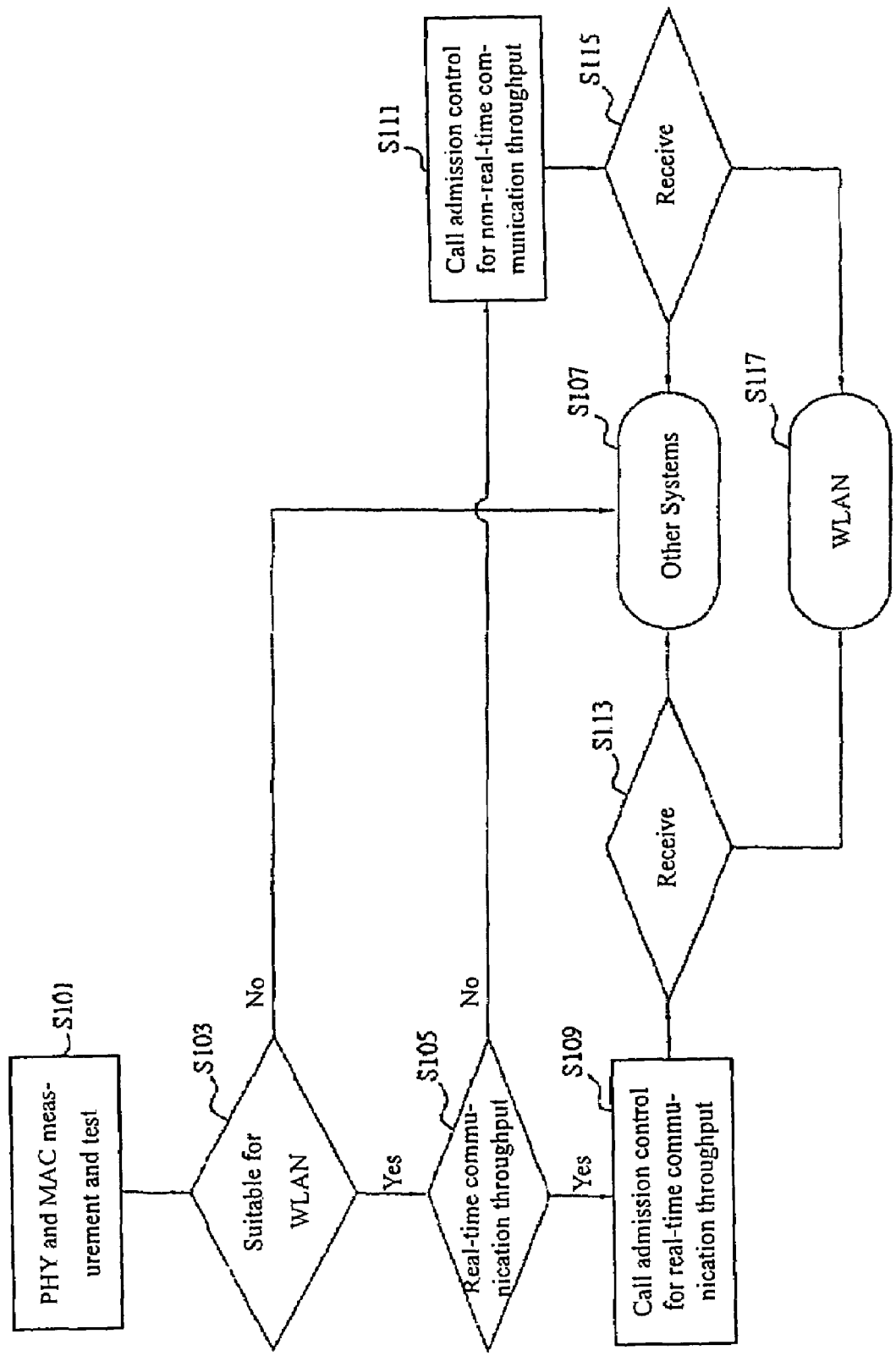
FIG. 1 depicts a flowchart for a two-tier call admission control algorithm for IEEE 802.11 WLAN of a preferred embodiment of the present invention.

FIG. 1 depicts a flowchart for a two-tier call admission control algorithm for IEEE 802.11 WLAN of a preferred embodiment of the present invention. In this figure, two independent viewpoints will be adopted to analyze the call admission control problem. First, from the perspective of a single user, because the channel status of the station platform is not always suitable for WLAN system, the station platform has to be partly tested with respect to the channel response, and the connection capacity for WLAN needs to be tested. Firstly, in the step S101, the MAC (Media Access Control) layer and the PHY (Physical) layer are measured and tested, which also corresponds to the first tier of the inventive algorithm. In the step S103, on the one hand, if it is suitable for WLANs, then go to Step S105 and determine whether it is a real-time communication throughput; on the other hand, if it is not suitable for WLANs, then go to Step S107 and get into another system.

Then, from the perspective of the overall system, in other words, the viewpoint corresponding to the second tier of the inventive algorithm, because different MAC algorithms are designed in order to adjust variation characteristics of different throughputs, therefore in the steps S109 and S111, they are necessary to possess independent call admission control units, respectively. In the preferred embodiment of the present invention, the throughput is categorized as a real-time communication throughput and a non-real-time communication throughput, so that, in Step S113 and Step S115, they are respectively having a matrix to decide if the required station platform has been accepted.

In the step S109, a call admission control algorithm for real-time communication throughput based on the buffer time is introduced. In this algorithm, another related concept, namely the three dimensional AARF Markov chain, is also proposed.

Rate adjustment is a process in which the transmission rate is dynamically switched in order to conform with the status of the variation channel, and the transmission rate of the station platform is adjusted so as to achieve an optimal communication throughput under a given channel status. AARF (Adaptive Auto Rate Fallback) is an adaptive rate algorithm, which utilizes an exponentially increasing threshold value to process the rate. Here the threshold value is used to determine when the present rate should be increased; however, this threshold value is not a fixed value. In AARF, for example, this threshold can be 10, 20, 40 and 50 (maximum bound). The AARF can be processed as follows: At first, when the transmission of the probing packet fails, not only the rate is switched to a previous value with a lower rate, but also make the threshold value multiply by two (the maximum bound is still set at 50, nevertheless). Additionally, when two consecutive transmissions fail, which in turn result in the reduction of the transmission rate, or the transmission of the probing packet succeeds, then the threshold value is reset to its initial value 10.

Figure 2A:
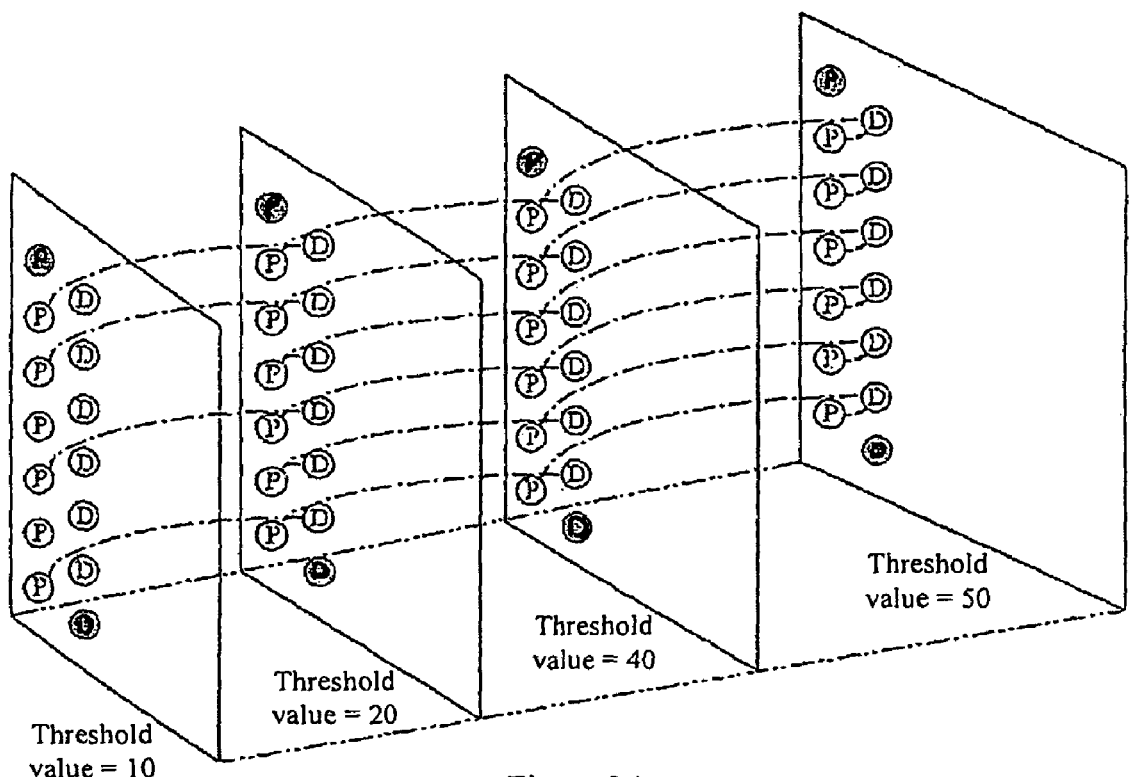
FIG. 2A depicts an operational diagram of the AARF's Markov chain for a preferred embodiment of the present invention.
Figure 2B:
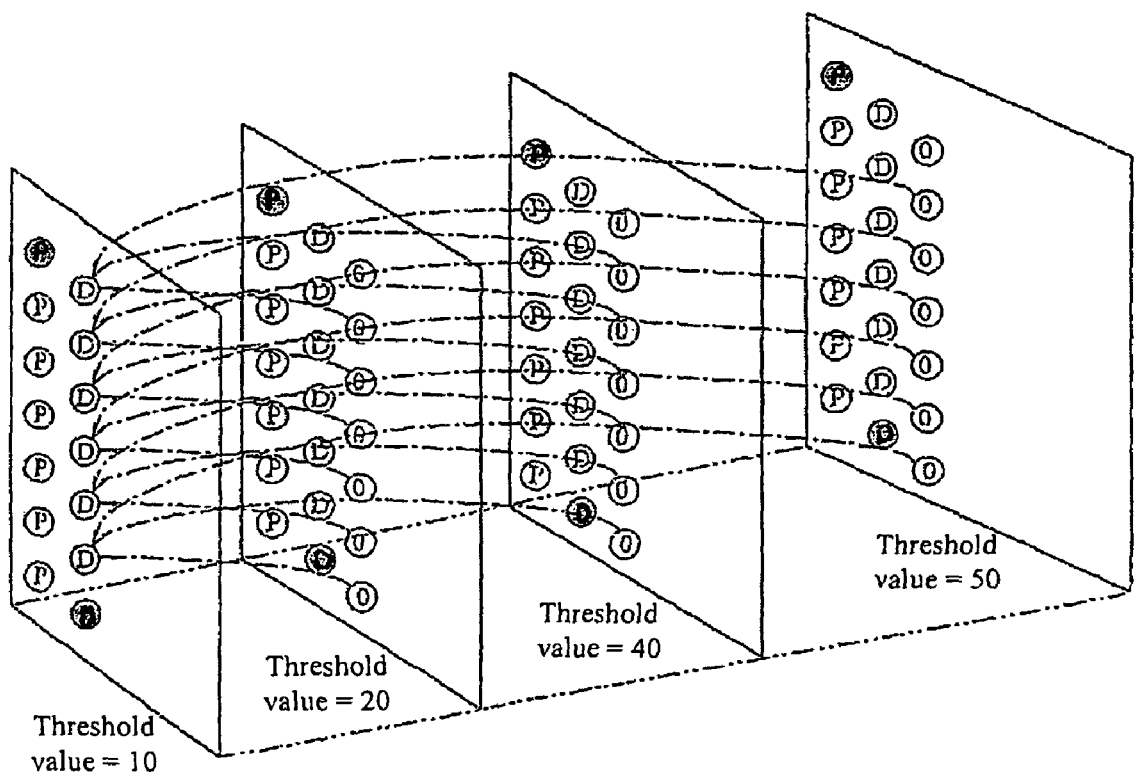
FIG. 2B depicts an operational diagram of the AARF's Markov chain for a preferred embodiment of the present invention.
Figure 2C:
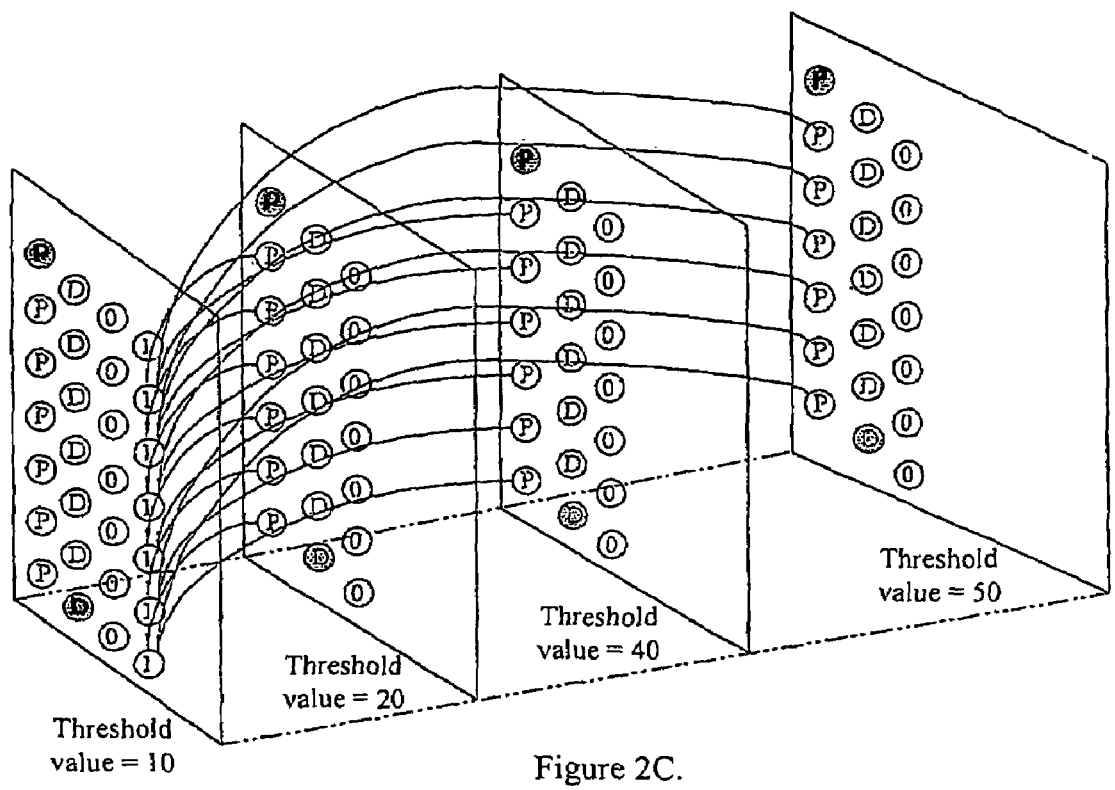
FIG. 2C depicts an operational diagram of the AARF's Markov chain for a preferred embodiment of the present invention.

The Markov chain of this AARF is of three-dimensional type. FIGS. 2A to 2C depict the operational diagrams of the Markov chain of the AARF in the preferred embodiment of the present invention. P denotes that the station platform has completed 10 consecutive transmissions and is just going to transmit the parameters of the probing packet. D denotes the parameters concerned with the transmission rate which has been reduced because of two consecutive transmission failures. The solid lines and the dash lines represent successful packet transmissions and failed packet transmission, respectively. When the Markov chain of the AARF is used, the probability of each state being in a steady state can be computed definitely, and the state probability can then be used to calculate the probability ($P_{down}$) of transmission decrease and the probability ($P_{up}$) of transmission increase in each mode under different SNR values. While designing the call admission control algorithm for the real-time throughput, these two probability parameters will be playing an crucial role. The related computations of the parameters please refer to the following equations:

$$P_{down_m} = P(m-1 \mid m)$$
$$= \frac{P(m-1 \cap m)}{P(m)}$$
$$= \frac{\sum_{d=1}^{4}\left\{P_f^2(m, SNR) \times \left[\sum_{k=1}^{T_d-1} b(m, k, d) + b(m, D, d)\right] + P_f(m, SNR) \times [b(m, p, d) + b(m, 0, d)]\right\}}{\sum_{d=1}^{4}\left\{\sum_{k=0}^{T_d} b(m, k, d) + b(m, P, d) + b(m, D, d)\right\}}$$

-continued $$P_{up_m} = P(m+1 \mid m)$$
$$= \frac{P(m+1 \cap m)}{P(m)}$$
$$= \frac{\sum_{d=1}^{4}\left\{\begin{array}{l} P_s^{10}(m, SNR) \times b(m, P, d) + \\ P_s^{T_d}(m, SNR) \times [b(m, D, d) + b(m, 0, d)] + \\ \sum_{k=1}^{T_d-1}\left(P_s^{T_d-k}(m, SNR) \times b(m, k, d)\right) \end{array}\right\}}{\sum_{d=1}^{4}\left\{\sum_{k=0}^{T_d-1} b(m, k, d) + b(m, P, d) + b(m, D, d)\right\}}$$

where m presents the present mode of the station platform, b is the state probability, $P_s$ represents the probability of the successful transmission of the packet, $P_f$ represents the probability of the failed transmission of the packet, d is the relative three-dimension value, and $T_d$ is the related threshold value.

Figure 3:
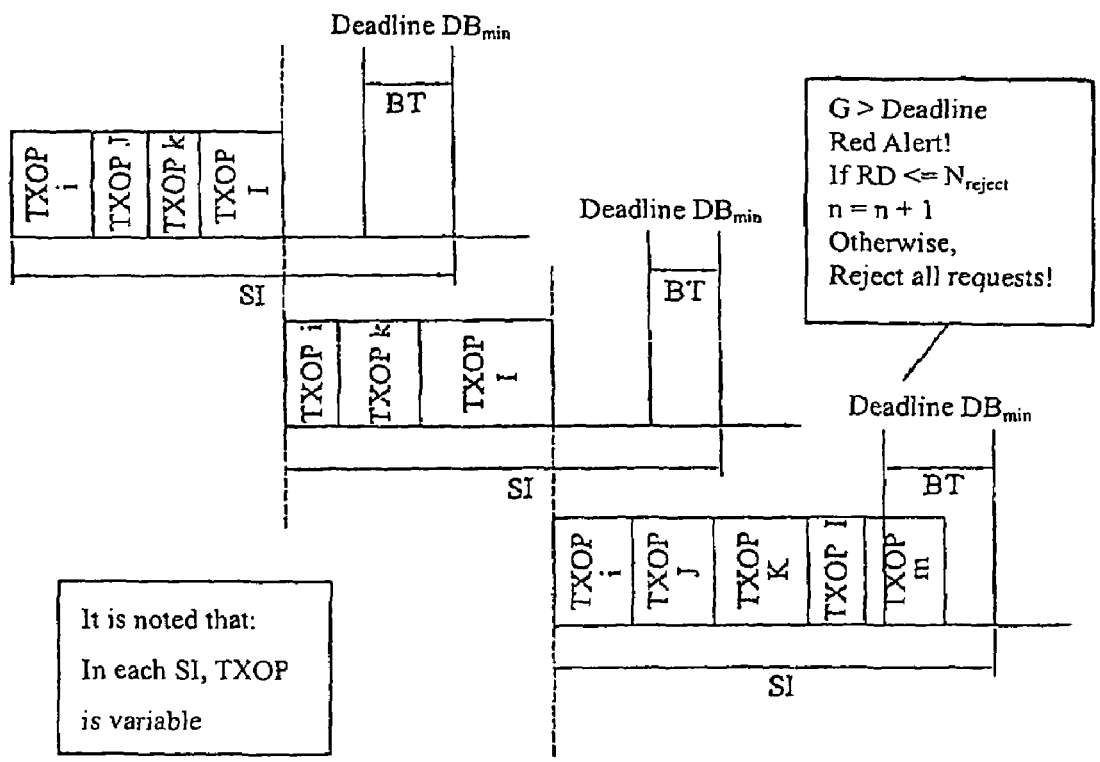
FIG. 3 shows a parametric operational diagram for a preferred embodiment of the present invention.

Each TXOP (Transmission Opportunity) is a variable value, which lies in a period between two points of a station platform and also in a variable state. In order to realize the delay bound (DB) requirement of each communication throughput, the adaptive buffer time (BT) is introduced to compensate for the variation of each TXOP. Some of the related parameters are defined as follows. FIG. 3 shows a parameter operation diagram of the preferred embodiment of the present invention. In the meantime, please also refer to FIG. 3, a service interval (SI) is defined by the following equation:

$$SI = \min(DB_i), \forall i$$

where SI is set equal to the minimum delay bound (DB) of the communication throughput; the total sum parameter G of each TXOP is defined by the following equation:

$$G = \sum_{i=1}^{k} T \times OP_i$$

where G represents the overall sum of time of all the platform stations in the SI period. Buffer time (BT) is defined as in the following equation:

$$BT = \sum_{i=1}^{k} N_i \times L_i \times \left(P_{down_{i,m}} \times \delta_{down_{i,m}} - P_{up_{i,m}} \times \delta_{up_{i,m}}\right) + \Delta$$

where N and L represent two communication parameters. As described above, BT also denotes a time interval, which is used to compensate for the variation of TXOP in each station platform. The rate adaptive technique AARF can be used to continuously track the channel status so as to achieve a maximal effective processing amount. For each station platform under an SNR value, each respectively has a related down transmission probability value and a related up transmission probability value. When the mode is increasing or decreasing, time difference will appear even if the amount of data is fixed. The time differences that are applicable to IEEE 802.11a are listed in the following table:

$$\delta_{down_{i,m}} = \begin{cases} 0 & m=1 \\ \frac{1}{6M} - \frac{1}{9M} = \frac{1}{18M} & m=2 \\ \frac{1}{9M} - \frac{1}{12M} = \frac{1}{36M} & m=3 \\ \frac{1}{12M} - \frac{1}{18M} = \frac{1}{36M} & m=4 \\ \frac{1}{18M} - \frac{1}{24M} = \frac{1}{72M} & m=5 \\ \frac{1}{24M} - \frac{1}{36M} = \frac{1}{72M} & m=6 \\ \frac{1}{36M} - \frac{1}{48M} = \frac{1}{144M} & m=7 \\ \frac{1}{48M} - \frac{1}{54M} = \frac{1}{432M} & m=8 \end{cases}$$

$$\delta_{up_{i,m}} = \begin{cases} \frac{1}{6M} - \frac{1}{9M} = \frac{1}{18M} & m=1 \\ \frac{1}{9M} - \frac{1}{12M} = \frac{1}{36M} & m=2 \\ \frac{1}{12M} - \frac{1}{18M} = \frac{1}{36M} & m=3 \\ \frac{1}{18M} - \frac{1}{24M} = \frac{1}{72M} & m=4 \\ \frac{1}{24M} - \frac{1}{36M} = \frac{1}{72M} & m=5 \\ \frac{1}{36M} - \frac{1}{48M} = \frac{1}{144M} & m=6 \\ \frac{1}{48M} - \frac{1}{54M} = \frac{1}{432M} & m=7 \\ 0 & m=8 \end{cases}$$

where $\delta_{down}$ denotes one bit's time difference when the mode is decreasing, $\delta_{up}$ denotes one bit's time difference when the mode is increasing, and $\Delta$ denotes the uncertain characteristics in compensating each communication throughput, in particular, a variable bit traffic (VBR) throughput. Although the throughput specification (TSPEC) provides a partial throughput statistics [for example, user priority, maximal MAC service data unit (MSDU), and average data rate], VBR throughput usually does not actually obey this characteristics. Hence, in the calculation of BT, $\Delta$ will be added in order to preserve some extra periodical time and therefore this unstable characteristic can be balanced. Summarizing the above description of the parameters, BT can be used to adjust the time variation induced by the rate adjustment and packet size variation, and the inter-arriving time variations of the packets. Deadline is defined in the following equation:

Deadline=SI−BT.

Deadline denotes a bound that is set to detect whether the system is still having the capability to compensate for each TXOP extension. If the overall sum G of each TXOP exceeds Deadline, it means that G may be exceeding SI (SI denotes the minimal delay bound) in the next SI interval. The present invention can be used to resolve the drawback that the packet decrease is intended to occur indicating that the system performance is going to degrade, which is hereafter to be described in detail. It is noted that, in the beginning of each SI interval, $P_{down}$ and $P_{up}$ must be updated in accordance with the previous SNR of each station platform. Furthermore, the buffer time BT has to be updated to a new value. While G is larger than Deadline, it indicates that, in the next period, G is having a certain probability to exceed SI because of the reduction of the transmission rate, which will result in the decrease of the packet. In addition to the parameters described above, a counting value n will be further introduced. If the overall sum (G) of each TXOP is larger than Deadline, n should be added by 1 automatically. Another parameter is further introduced. Rejection Density (RD) is defined as n divided by the observation interval (in seconds), which represents that budgets violate (G is larger than Deadline) the density in a certain time interval. If RD is larger than a prescribed value $N_{reject}$, input throughput will be rejected. This is designed for the purpose of preventing the SNR (signal-to-noise ratio) of the station platform from sudden change. In this algorithm, RD shares the same concept and further extends it functionality so as to adapt to different requirements of packet loss rates (PLR). Obviously, if the PLR requirement is relaxed, then $N_{reject}$ can be set at a larger value so that a larger rejection rate is allowable, and vice versa. Briefly, the criterion being used to determine if a new communication throughput should be rejected is defined by the following equation:

(G>Deadline)∩(RD>$N_{reject}$)

To summarize the above description, in the present invention, because a two-tier method is adopted to process the user algorithm and the system algorithm, respectively, it is able to improve the throughput of the overall system, while guarantees every single user's quality of service.

Although the present invention is disclosed in the preferred embodiments described above, the inventive idea should not be limited only to those. It will be understood by those skilled in the art that various other changes in the form and details may be made without departing from the spirit and scope of the present invention. It is to be understood that various changes may be made in adapting to different embodiments without departing from the broader concepts disclosed herein and comprehended by the claims that follow.

The invention claimed is:

1. A two-tier call admission control method in an IEEE 802.11 WLAN, used to admit of provision of high quality of service, comprising the following steps:

having a single user and an overall system correspond respectively to a first layer testing and a second layer testing;

controlling a measurement of a physical layer and a testing of the physical layer to serve as the first layer testing;

allowing a plurality of station platforms that only pass the first layer testing to initiate an associated request to the overall system, and then get into the second layer testing; and introducing a buffer time into the second layer testing in order to compensate for a TXOPs (Transmission Opportunity) variation of the station platforms induced by status change of the physical layer wherein the method further comprising a parameter G, which denotes the sum of each of the TXOPS and is defined by:

$$G = \sum_{i=1}^{k} T \times OP_i,$$

where k and i are integers;

and a parameter SI (service interval) which is defined by SI=min ($DB_i$), ∀i, where DB denotes a delay bound of a communication throughput, and i is an integer.

2. The two-tier call admission control method in accordance with claim 1, wherein a transmission probability between different modes, which is served as a parameter in calculation of a buffer timer the buffer time, is defined by a three-dimensional Adaptive Auto Rate Fallback (AARF) Markov chain described by the following equations:

$$P_{down_m} = P(m-1 \mid m) = \frac{P(m-1 \cap m)}{P(m)} =$$

$$\frac{\sum_{d=1}^{4} \left\{ P_f^2(m, SNR) \times \left[ \sum_{k=1}^{T_d-1} b(m, k, d) + b(m, D, d) \right] + P_f(m, SNR) \times [b(m, p, d) + b(m, 0, d)] \right\}}{\sum_{d=1}^{4} \left\{ \sum_{k=0}^{T_d} b(m, k, d) + b(m, P, d) + b(m, D, d) \right\}}$$

$$P_{up_m} = P(m+1 \mid m) = \frac{P(m+1 \cap m)}{P(m)} =$$

$$\frac{\sum_{d=1}^{4} \left\{ \begin{array}{l} P_s^{10}(m, SNR) \times b(m, P, d) + P_s^{T_d}(m, SNR) \times [b(m, D, d) \\ + b(m, 0, d)] + \sum_{k=1}^{T_d-1} \left( P_s^{T_d-k}(m, SNR) \times b(m, k, d) \right) \end{array} \right\}}{\sum_{d=1}^{4} \left\{ \sum_{k=0}^{T_d-1} b(m, k, d) + b(m, P, d) + b(m, D, d) \right\}}$$

where m denotes a present mode of the station platform, b is a state probability, $P_s$ represents a probability of a successful transmission of a packet, $P_f$ represents a probability of a failed transmission of a packet, d denotes a relative three-dimension value, $P_{down}$ represents a probability of transmission decrease, $P_{up}$ represents a probability of transmission increase, P denotes that the station platform has completed 10 consecutive transmissions and is just going to transmit a plurality of parameters of a probing packet, SNR represents a signal-to-noise ratio of the station platform from sudden change, D denotes a plurality of parameters concerned with a transmission rate, and $T_d$ and k are related threshold values.

3. The two-tier call admission control method in accordance with claim 1, further comprising a parameter BT (buffer time), which is defined by the following equation:

$$BT = \sum_{l=1}^{k} N_i \times L_i \times \left( P_{down_{i,m}} \times \delta_{down_{i,m}} - P_{up_{i,m}} \times \delta_{up_{i,m}} \right) + \Delta$$

where $\delta_{down}$ denotes one bit's time difference when a mode is decreasing, $\delta_{up}$ denotes one bit's time difference when a mode is increasing, and $\Delta$ denotes uncertain characteristics in compensating each communication throughput, k and i are integers, N, L are two communication parameters, $P_{down}$ represents a probability of transmission decrease, $P_{up}$ represents a probability of transmission increase and m denotes a present mode of the station platform.

4. The two-tier call admission control method in accordance with claim 1, further comprising a parameter deadline, which is defined via the following equation:

Deadline=SI−BT, where SI represents the service interval and BT represents the buffer time.

5. The two-tier call admission control method in accordance with claim 1, further comprising a decision criterion, which is defined via the following equation:

(G>Deadline)∩(RD>$N_{reject}$), where RD denotes a rejection density, $N_{reject}$ denotes a prescribed value, G represents the overall sum of time of all the platform stations in the SI period and Deadline denotes a bound that is set to detect whether the system is still having a capability to compensate for each transmission opportunity (TXOP) extension, if the equation holds, then the overall system rejects any new request for connection, if the equation does not hold, then the overall system consents to new associated requests.

* * * * *